April 8, 1952  H. M. ARAKELIAN  2,592,104
LIQUID FILTERING ELEMENT
Filed Nov. 14, 1947  4 Sheets-Sheet 2
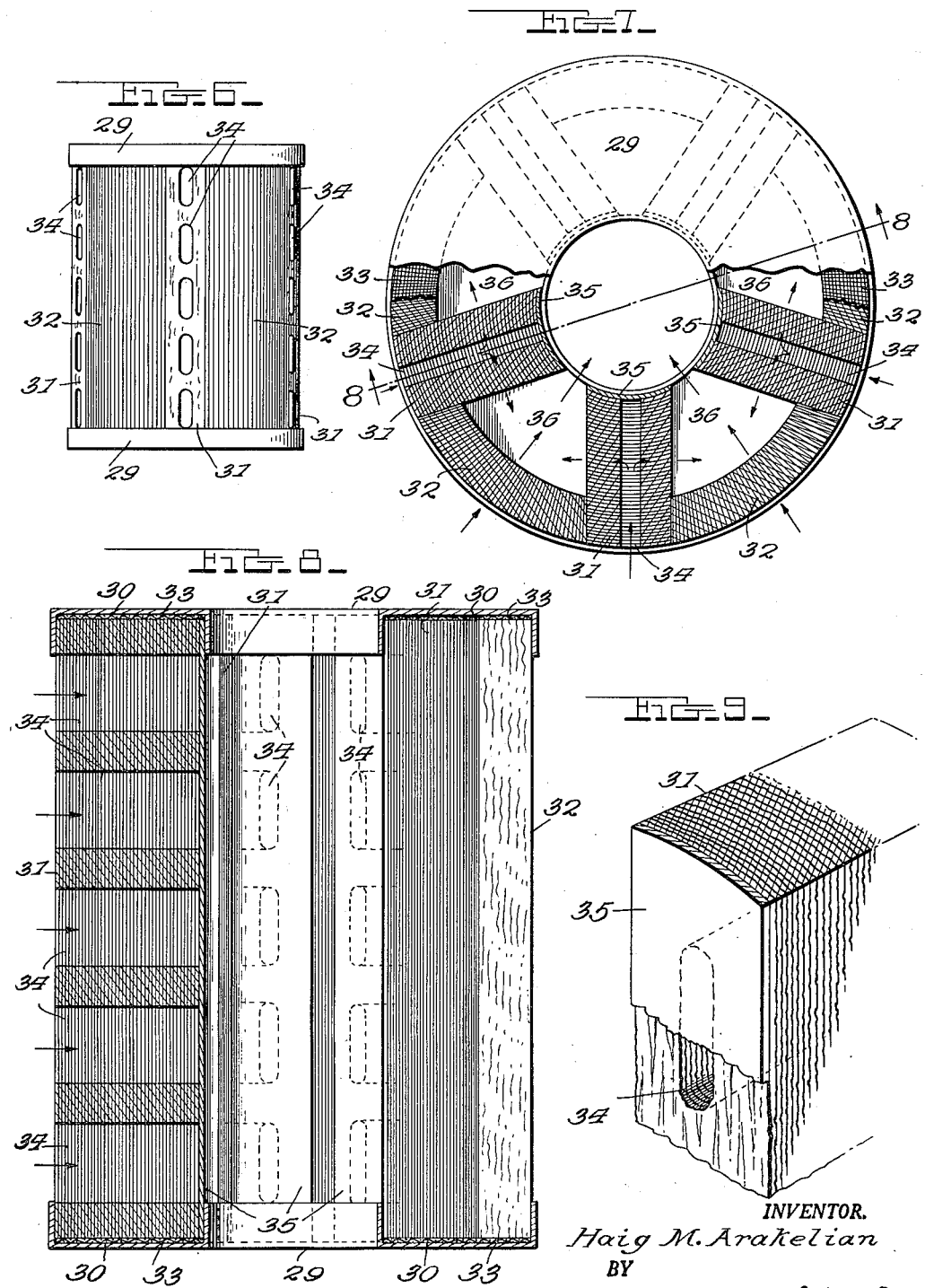
INVENTOR.
Haig M. Arakelian
BY
H. B. Willson & Co.
atty.

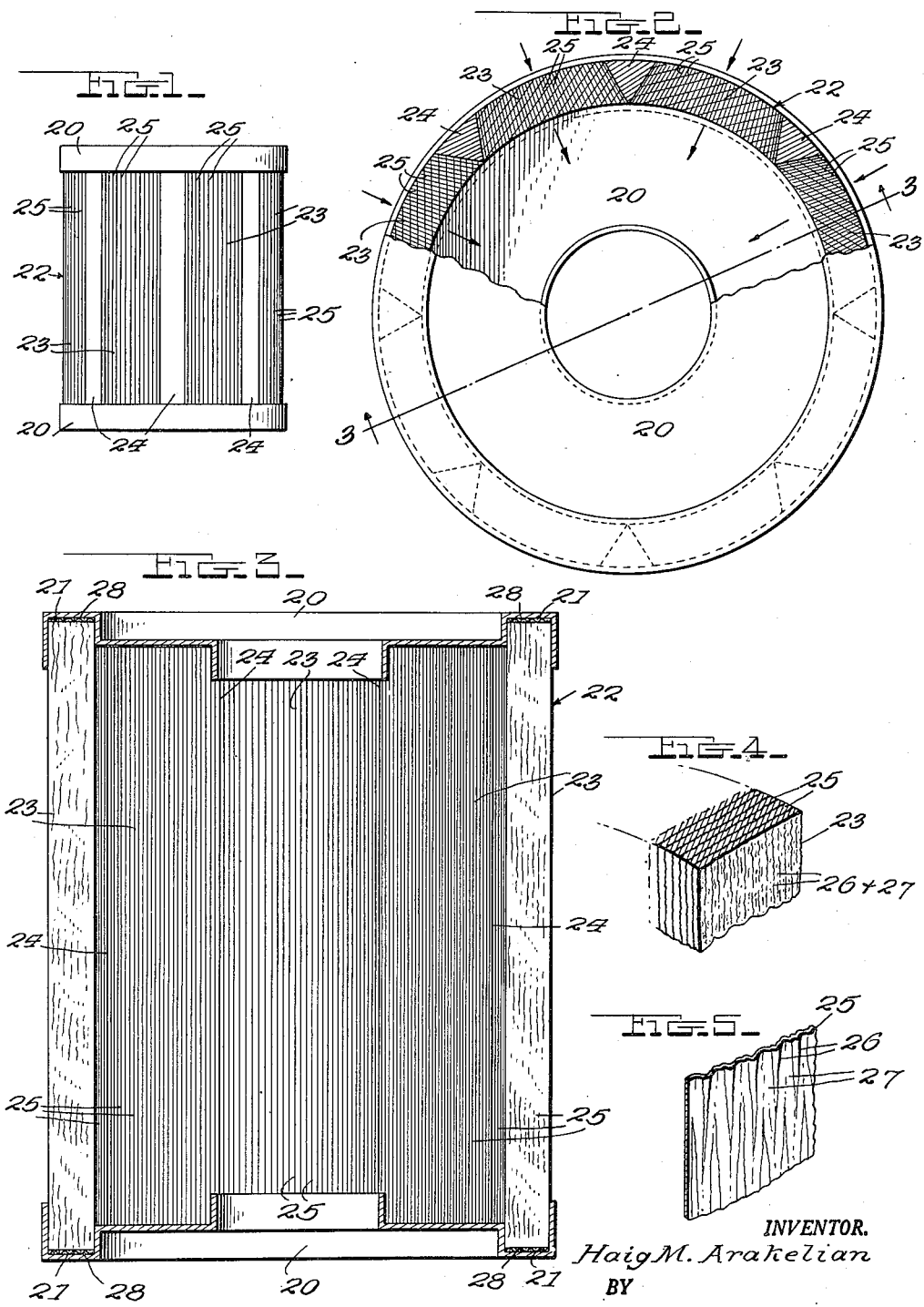

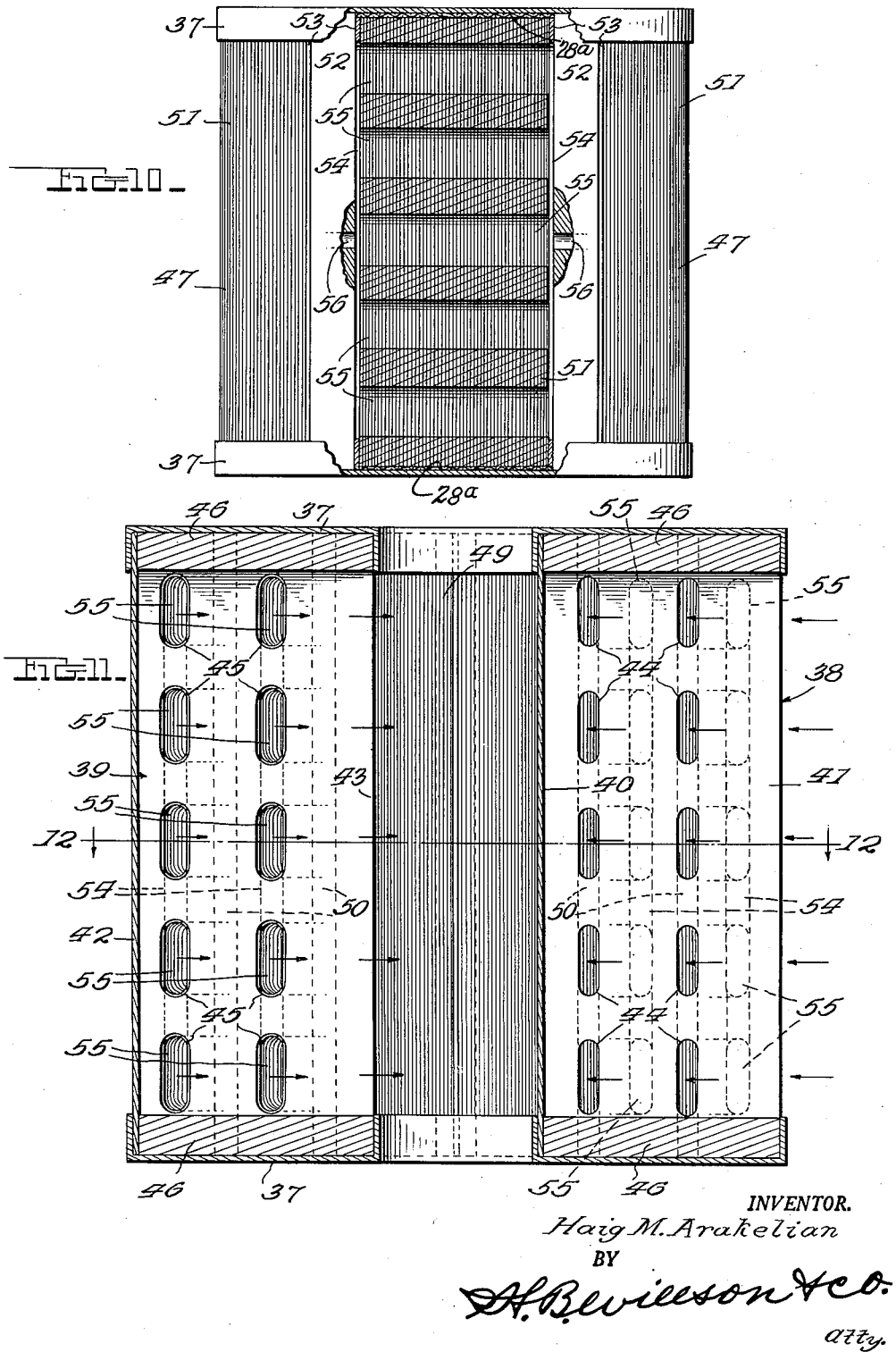

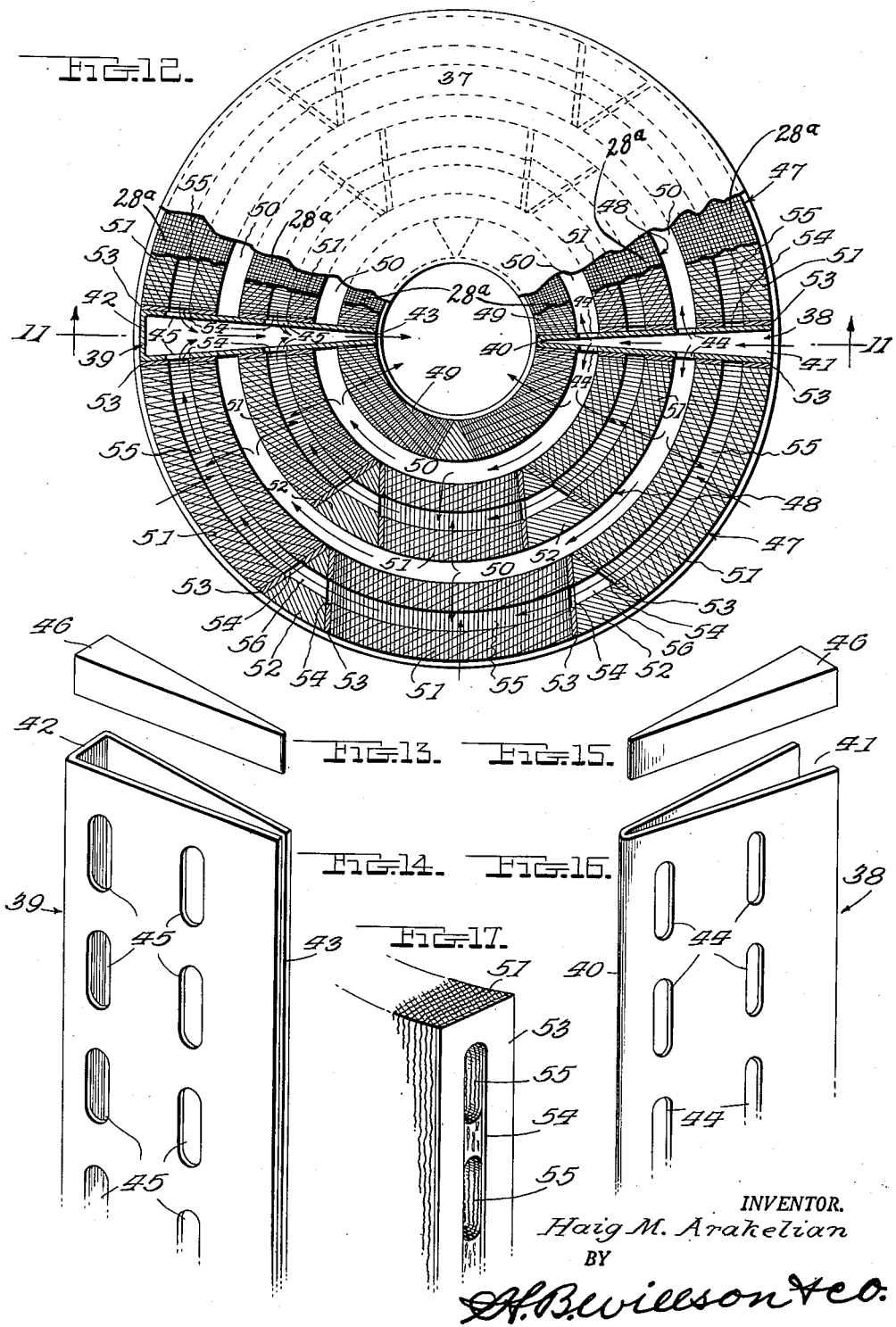

Patented Apr. 8, 1952

2,592,104

UNITED STATES PATENT OFFICE 2,592,104

LIQUID FILTERING ELEMENT

Haig M. Arakelian, Peabody, Mass.

Application November 14, 1947, Serial No. 786,080

13 Claims. (Cl. 210—183)

This filter element is intended to be used as a replaceable cartridge in any conventional sealing plate and filter shell assembly, and is operable to remove dirt and various other contaminants from oils, other distillates and liquids in general. The invention utilizes the principles of edge filtration and embraces new structure that lends itself to flexibility of design, ease and economy of construction, and maintenance of effective and desirable filtration characteristics, of low-pressure drop good cleaning, and long filter life.

Figure 1 of the accompanying drawings is a side elevation showing one form of construction.

Fig. 2 is a top plan view partly broken away and in section.

Fig. 3 is a vertical sectional view on line 3—3 of Fig. 2.

Fig. 4 is a sectional perspective view showing a portion of one of the liquid filtering blocks.

Fig. 5 is an exaggerated fragmentary perspective view showing a portion of the sheet material used in constructing the filtering blocks.

Fig. 6 is a side elevation showing a second form of construction.

Fig. 7 is a top plan view, partly broken away and in section.

Fig. 8 is a vertical sectional view on line 8—8 of Fig. 7.

Fig. 9 is a sectional perspective view showing a portion of one of the radially disposed filtering blocks of Figs. 7 and 8.

Fig. 10 is a side elevation, partly broken away and in section showing a third form of construction.

Fig. 11 is a vertical sectional view on line 11—11 of Fig. 12.

Fig. 12 is a horizontal sectional view partly in elevation, as indicated by line 12—12 of Fig. 11.

Figs. 13 and 14 are perspective views showing elements used in constructing the hollow liquid outlet partition of Figs. 11 and 12.

Figs. 15 and 16 are perspective views showing elements used in constructing the hollow liquid inlet partition of Figs. 11 and 12.

Fig. 17 is a sectional perspective view showing a portion of one of the arcuate filtering blocks shown in Fig. 12.

Preferences have been illustrated and will be rather specifically described, but variations may of course be made within the scope of the invention as claimed.

In the form of construction shown in Figs. 1 to 5, two end caps 20 are provided, which may well be stamped or formed from sheet metal or other sheet material, and if metal be not used, the sheet material will of course be coated or impregnated to render it impervious to the liquid or liquids to be filtered. These caps 20 are so shaped as to provide their outer peripheral portions with inwardly facing circular channels 21, in which the ends of a cylindrical wall-like filtering member 22 are secured by means of an appropriate cement.

The filtering member 22 is composed of an annular series of circumferentially spaced filtering blocks 23 of arcuate transverse section and extending from one of the caps 20 to the other, and circumferentially spaced bars 24 also extending from one cap to the other, between and in contact with the blocks 23. These bars or spacing elements 24 are also arranged in an annular series and are of wedge shape in transverse section and may well be formed from wood impregnated or coated to render them impervious to the liquid or liquids to be filtered.

Each filtering block 23 is composed of a multiplicity of strips 25 of paper-like sheet material, disposed side-to-side in contact with each other, said strips being preferably formed from embossed paper so treated as to render it impervious to the liquid or liquids to be filtered. For such treatment, a melamine or a phenolic resin is preferably used. The solid concentration is low enough to allow the filtering medium to absorb the resin. No bridging takes place between the strips, and after treating surplus may be thrown off by means of a centrifugal extraction apparatus or the like. The paper used may well be from .010" to .020" thick and it may well be wood pulp stock paper purchased on the paper market. The strips of paper are embossed to provide them with a multiplicity of crests 26 and valleys 27 as shown more particularly in Fig. 5. By the word "embossed" is meant a paper that has passed through an engraving, crepeing or embossing process, leaving the paper with permanent impressions providing the crests and valleys. The pattern is irregular and the paper is generally purchased from stock in the paper market, in embossed condition. The embossed paper strips in contact with each other, provide the filtering blocks 23 with a countless number of fine channels through which the liquid may flow inwardly as indicated by the arrows in Fig. 2, leaving foreign matter deposited upon the outer peripheries of the filtering blocks.

The various paper strips 25 are bound together at their ends by means of strips of gauze or the like 28 secured to them by suitable cement, said gauze strips serving to hold the strips assembled prior to fastening the filtering blocks in the cartridge assembly. By making the filter blocks 23 of many treated and embossed paper strips held together at their ends by pieces of gauze secured by a suitable cement, the blocks may be quickly and easily assembled between the wedge strips 24 and will be held under more or less compression in the assembled filter unit or cartridge shown in Figs. 1 and 2. The cartridge may thus be inexpensively produced and may be thrown away and replaced by a new cartridge after it ceases to give the proper filtering action.

One practical way of making the blocks 23 is to form a large rectangular master-block in which the sheets are secured together at their ends by pieces of gauze united to the ends by a rubber or elastic cement, and then slicing such master-block up into pieces to form the blocks 23. These blocks being made of flexible paper sheets held together by the gauze strips can be flexed into the curved shape shown in Fig. 2.

In the form of construction shown in Figs. 6, 7, 8 and 9, the end caps 29 are formed with continuous channels 30 of greater width than the channels 21 of the caps 20, to receive the ends of a wall-like filtering member composed of radial filtering blocks 31 and transversely arcuate filtering blocks 32 which are disposed between and in contact with the outer portions of said radial blocks. All of the blocks 31 and 32 have the same general structure as the blocks 23 above described and their ends are preferably provided with cemented-on strips 33 of gauze or the like. The radial blocks 31, however, are each formed with a plurality of liquid passages 34 from their outer edges to points near their inner edges, the inner ends of these passages being closed by heavy strips 35 of liquid-proofed paper or the like.

The liquid to be filtered flows into the passages 34 and from these passages flows edgewise between the embossed strips of paper of which the blocks 31 are composed, and the liquid also flows inwardly between the embossed paper strips of which the filtering blocks 32 are constructed. Thus, the filtered liquid is received in the chambers 36 formed between the inwardly extending portions of the radial filtering blocks 31 and discharges inwardly between the spaced inner portions of these blocks, and foreign matter collects upon the outer peripheries of the filtering blocks 32 and upon the side walls of the passages 34.

In the form of construction shown in Figs. 10 to 17, end caps 37 are shown, similar to the caps 29. The wall-like filtering member of this form includes a liquid inlet partition 38 and a liquid outlet partition 39 extends between these caps 37, said partitions being disposed radially with respect to a center line extending between said caps and being spaced apart along a diametrical line intersecting said center line. The liquid inlet partition 38 is closed at its inner edge as seen at 40 and is open at its outer edge as seen at 41. The liquid outlet partition 39, however, is closed at its outer edge as seen at 42 and is open at its inner edge as shown at 43. The side walls of the inlet partition 38 are formed with rows of vertically spaced openings 44, and similar openings 45 are formed in the side walls of the outlet partition 39, for purposes to appear.

Each partition 38, 39, is preferably formed from a single sheet of cardboard or the like suitably treated or impregnated to render it impervious to liquid, and two spacing blocks 46. The piece of material is folded to form the side walls and closed edge of the partition and the spacing blocks 46 are suitably cemented between said side walls to hold them in spaced relation. The blocks 46 are preferably wooden wedges and they impart an inwardly tapered form to the partitions.

In this form of the invention the wall-like filtering member between the end caps 37 includes in addition to the spacing elements or partitions 38, 39 a composite filtering means which I will now describe. At each side of the above mentioned diametrical line upon which the partitions 38 and 39 are located, I have shown three substantially semi-cylindrical filtering wall-like portions—an outer wall portion 47, an intermediate wall portion 48 and an inner wall portion 49. The inner wall portion 49 may be constructed in substantially the same manner as the wall-like member 22 of Figs. 1 to 3, and will require no further explanation. The wall portions 47 and 48, however, require description which will later follow. At this point, however, it may be stated that the three semi-circular walls 47, 48 and 49 are spaced apart radially to provide liquid-receiving chambers 50 between said wall portions and extending from one end cap 37 to the other. It may also be here explained that the openings 44 of the hollow inlet partition 38, directly communicate with these chambers 50, as seen in Fig. 12. The portions of these chambers, however, at the sides of the outlet partition 39, are closed by portions of this partition, as also seen in Fig. 12.

Each semi-circular wall portion 47, 48 is composed of arcuate filtering blocks 51 and wedge-shaped rigid bars 52 between said filtering blocks and in contact therewith, said blocks and bars extending from one end cap 37 to the other. The general construction of each filtering block 51 is similar to the blocks above described, in that it is composed of embossed strips of paper or the like, suitably treated or coated. Also as shown at 28ª in Figs. 10 and 12 gauze strips are adhesively secured to the ends of the paper strips, these gauze strips 28ª corresponding to the strips 28 of Fig. 3 and 33 of Fig. 8. However, secured to the outermost of these strips, there are relatively heavy strips 53 which are also suitably treated to render them imprevious to the liquid. Each of these strips 53 is formed with a longitudinal slot 54, and each of the filtering blocks 51 is formed between its inner and outer peripheries with arcuate liquid passages 55, the ends of which communicate with the slots 54. Also, the slots 54 of the blocks 51 adjacent the outlet partition 39, communicate directly with the slots or openings 45 of this partition. The slots 54 of the blocks 51 adjacent the partition 38, however, are closed by portions of this partition, as seen in Fig. 12.

Each of the bars 52 is formed with a port 56 which establishes communication between the slots 54 of the adjacent strips 53 as seen in Figs. 10 and 12. While only one port 56 has been shown in each bar 52, it is obvious that a plurality of such ports could well be provided.

The liquid being filtered not only flows inwardly through the filtering blocks 51 at the periphery of the cartridge, but it enters the wedge 38 and flows through the openings 44 of this wedge or partition and is thus received in the semi-circular liquid chambers 50. From these chambers, it flows edgewise of the paper sheets of the wall portions into the passages 55 and from these passages, it discharges through the openings 45 into the outlet partition 39, and then on to the center of the cartridge. While most of the liquid entering the passages 55 will take the easiest course through the partition 39 to the center of the cartridge, it is obvious that some of it may pass from the passages 55 into the passages 50 between the sheets forming the wall portions 47, 48. The liquid flowing inwardly through the inner wall portion 49 also reaches this central zone. It will thus be seen that an unusually large filtering area has been provided in the form of construction under consideration. This construction is preferably employed for larger cartridges (four inch diameter or over) and affords maximum filtering area. For small diameter elements (two to three inches), the construction shown in Figs. 1, 2 and 3 is preferable; and for medium diameter elements (three to four inches), the structure shown in Figs. 6 to 9 offers the largest filtering area.

From the foregoing, taken in connection with the accompanying drawings, it will be seen that novel and advantageous provision has been made for carrying out the object of the invention, and while preferences have been disclosed, attention is again invited to the possibility of making variations within the scope of the invention as claimed.

I claim:

1. In a liquid filter cartridge, a generally cylindrical filter member through which the liquid flows from one periphery of said member to the other, said member including transversely arcuate filter blocks extending from end to end of said member, each arcuate filter block consisting of a plurality of strips of paper disposed in side-to-side contact with each other and end binding strips of gauze material adhesively secured to the end edges of the strips to yieldably hold them in block form, said strips of paper being impervious to the liquid to be filtered and being embossed and having a myriad of crests and valleys, said strips of paper each having one of its longitudinal edges located at the outer periphery of the block and the other of its longitudinal edges disposed at the inner periphery of the block, and end caps secured to the ends of said member.

2. The structure of claim 1 in which the arcuate filter blocks of said member are spaced apart in at least one annular series, together with separate spacing elements disposed between next adjacent blocks and extending from end to end of said member, said end caps having circular channels in which the ends of said blocks and said elements are received to hold them assembled.

3. The structure of claim 1 in which the arcuate filter blocks of said member are spaced apart in at least one annular series, together with an annular series of separate rigid spacing bars, said bars being arranged between next adjacent blocks and being wedge-shaped in transverse section with their pointed edges disposed inwardly, said bars extending from end to end of said member, and said end caps having circular channels in which the ends of said blocks and said bars are received to hold them assembled.

4. The structure of claim 2 in which said spacing elements consist of radially disposed filter blocks which project inwardly beyond the inner sides of the arcuate filter blocks and have their inner edges spaced apart, said radially-disposed filter blocks each having a plurality of liquid passages extending from its outer peripheral edge to a point near its inner peripheral edge, the inner ends of said liquid passages being closed.

5. The structure of claim 4 in which each of said radially-disposed filter blocks comprises a plurality of strips of paper extending from one of said caps to the other and disposed in side-to-side contact with each other and end binding strips of gauze adhesively secured to the end edges of the last mentioned strips to yieldably hold them in block form, the strips of said radially disposed filter blocks being impervious to the liquid to be filtered and being embossed and having a myriad of crests and valleys, the contacting sides of the last mentioned strips being disposed circumferentially the member.

6. The structure of claim 1 in which said cylindrical filter member also includes a hollow liquid inlet partition and a hollow liquid outlet partition both extending from one of said caps to the other, said partitions being radially disposed with respect to a center line from one of said caps to the other and being spaced apart along a diametrical line intersecting said center line, said liquid inlet partition being open at its outer edge and closed at its inner edge, said liquid outlet partition being closed at its outer edge and open at its inner edge; and in which said arcuate filter blocks are arranged to provide at least two concentric substantially semi-circular filtering wall portions at each side of said diametrical line and having edges abutting said partitions, said semicircular filtering wall portions extending from one of said caps to the other and being spaced apart radially to provide two semi-circular liquid receiving chambers at opposite sides of said diametrical line and extending from one of said caps to the other, said hollow liquid inlet partition having openings communicating directly with said semi-circular chambers for conducting liquid into the latter, said semi-circular filtering wall portions each having arcuate liquid conducting means between and concentric with their inner and outer peripheries, said hollow liquid outlet partition having openings communicating directly with said arcuate liquid conducting means for conducting liquid from the latter, said hollow liquid inlet partition having portions closing the adjacent ends of said arcuate liquid conducting means, said liquid outlet partition having portions closing the adjacent ends of said semi-circular chambers.

7. The structure of claim 6 in which the arcuate filter blocks in each of said concentric filtering wall portions have formed therein portions of said liquid conducting means; each of said filtering wall portions also including rigid bars extending from one of said caps to the other, said bars being of wedge shape in transverse section and being disposed between and in contact with next adjacent filter blocks, said bars having liquid passages constituting other portions of said arcuate liquid conducting means.

8. The structure of claim 1 in which said cylindrical filter member also includes a hollow liquid inlet partition and a hollow liquid outlet partition both extending from one of said caps to the other, said partitions being radially disposed with respect to a center line from one of said caps to the other and being spaced apart along a diametrical line intersecting said center line, said liquid inlet partition being open at its outer edge and closed at its inner edge, said liquid outlet partition being closed at its outer edge and open at its inner edge; and in which said arcuate filter blocks are arranged to provide at least two concentric substantially semi-circular filtering wall portions at each side of said diametrical line and having edges abutting said partitions, said semi-circular filtering wall portions extending from one of said caps to the other and being spaced apart radially to provide two semi-circular liquid receiving chambers at opposite side of said diametrical line and extending from one of said caps to the other, said hollow liquid inlet partition having openings communicating directly with said semi-circular chambers for conducting liquid into the latter, relatively thick strips covering the upright edges of said arcuate filter block forming said wall portions, said thick strips being formed with slots providing longitudinal channels, said wall portions also including rigid bars of wedge shape in transverse section and also extending from one of said caps to the other, said bars being disposed between next adjacent arcuate filter blocks and in contact with said edge strips, each of said filter blocks having a plurality of arcuate liquid passages between and concentric with its inner and outer peripheries and directly communicating at their ends with said channels, said bars having ports establishing communication between the channels in the edge strips of the adjacent blocks, said liquid outlet partition having openings placing its interior in communication with said arcuate passages of the adjacent filter blocks.

9. A filtering block for use as a part of a filtering wall of a liquid filter cartridge and through which liquid flows, said block comprising a plurality of long and narrow liquid impervious strips of paper disposed side-to-side and having their longitudinal edges located at the sides of the block, the contacting sides of said strips being embossed and having a myriad of crests and valleys, providing minute channels through which the liquid flows edgewise of said strips, and end strips of gauze secured to the end edges of said impervious strips to yieldably hold said strips together in block form.

10. A structure as specified in claim 9; said block having passages extending through all of said strips, and a relatively thick barrier strip secured against one of the outermost of the aforesaid strips and closing one end of said passages.

11. A structure as specified in claim 9; said block having passages extending through all of said strips and relatively thick strips secured against the outermost of the aforesaid strips and having longitudinal slots with which the ends of said passages directly communicate.

12. A filtering block through which liquid flows, said block comprising a plurality of liquid impervious strips of paper disposed side-to-side and having their edges located at the sides of the block, the contacting sides of said strips being embossed and having a myriad of crests and valleys, providing minute channels through which the liquid flows edgewise of said strips, together with flexible binding strips secured to the ends of said impervious strips to yieldably hold them against separation prior to securing of said block in a filter assembly.

13. In a filter cartridge, a hollow liquid-conducting partition of rectangular shape in side elevation and of wedge shape in cross section, said partition being open at one longitudinal edge and closed at its other longitudinal edge, the side walls of said partition being formed with liquid-conducting openings, said partition being composed of a single sheet of material folded to form said side walls and said closed edge, and rigid wedge shaped spacing blocks secured between the ends of said side walls and holding them in spaced relation with each other.

HAIG M. ARAKELIAN.

REFERENCES CITED

The following references are of record in the file of this patent:

UNITED STATES PATENTS

| Number | Name | Date |
|---|---|---|
| 550,073 | Isaacs | Nov. 19, 1895 |
| 953,607 | Grantzdorffer | Mar. 29, 1910 |
| 1,250,275 | Brown | Dec. 18, 1917 |
| 1,366,147 | Worthington | Jan. 18, 1931 |
| 1,773,797 | Hele-Shaw | Aug. 26, 1930 |
| 2,339,703 | Kamrath | Jan. 18, 1944 |
| 2,409,705 | Reinhardt | Oct. 22, 1946 |
| 2,413,991 | Newman | Jan. 7, 1947 |

FOREIGN PATENTS

| Number | Country | Date |
|---|---|---|
| 105,789 | Australia | Nov. 9, 1938 |